(12) United States Patent
Takegami et al.

(10) Patent No.: US 10,454,374 B2
(45) Date of Patent: Oct. 22, 2019

(54) POWER SUPPLY

(71) Applicant: TDK CORPORATION, Tokyo (JP)

(72) Inventors: Eiji Takegami, Tokyo (JP); Tomokazu Ikarashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/136,904

(22) Filed: Sep. 20, 2018

(65) Prior Publication Data
US 2019/0149048 A1    May 16, 2019

(30) Foreign Application Priority Data
Nov. 13, 2017 (JP) .................. 2017-217874

(51) Int. Cl.
| | |
|---|---|
| *H02M 3/158* | (2006.01) |
| *G05F 1/02* | (2006.01) |
| *H02M 3/157* | (2006.01) |
| *H02M 1/00* | (2006.01) |

(52) U.S. Cl.
CPC .......... *H02M 3/1584* (2013.01); *G05F 1/02* (2013.01); *H02M 3/157* (2013.01); *H02M 3/1588* (2013.01); *H02M 2001/0009* (2013.01)

(58) Field of Classification Search
CPC ....... G05F 1/02; H02M 3/157; H02M 3/1588; H02M 3/1584; H02M 2001/0009
See application file for complete search history.

(56) References Cited

U.S. PATENT DOCUMENTS

| | | | | |
|---|---|---|---|---|
| 5,796,601 A | * | 8/1998 | Yamamoto | H02M 7/17 363/41 |
| 2007/0200538 A1 | * | 8/2007 | Tang | H02M 3/157 323/237 |
| 2009/0174262 A1 | * | 7/2009 | Martin | H02M 3/157 307/82 |
| 2010/0270989 A1 | * | 10/2010 | Sasaki | H02M 3/157 323/282 |
| 2011/0134672 A1 | * | 6/2011 | Sato | H02M 1/10 363/126 |
| 2019/0089245 A1 | * | 3/2019 | King | G05F 1/46 |

FOREIGN PATENT DOCUMENTS

JP        2007-221880        8/2007

* cited by examiner

*Primary Examiner* — Jue Zhang
*Assistant Examiner* — Kevin H Sprenger
(74) *Attorney, Agent, or Firm* — Greenblum & Bernstein, P.L.C.

(57) ABSTRACT

A power supply includes: a power converter that converts an input voltage by switching at a switch and supplies an output voltage and an output current to an output terminal connected to a load; a current detector that detects the output current or a current that changes with the output current and outputs a current detection signal whose voltage value changes with the output current; a signal corrector that inputs and corrects the current detection signal and generates and outputs a corrected current detection signal whose voltage value corresponds to the value of the output current; a matching circuit that inputs the corrected current detection signal and outputs to a balanced terminal; and a controller that inputs the corrected current detection signal and a balanced voltage signal generated at the balanced terminal and controls switching operations of the switch to reduce a difference between the two signals.

3 Claims, 2 Drawing Sheets

POWER SUPPLY

FIELD OF THE INVENTION

The present invention relates to a power supply configured so that a plurality of power supplies can be connected in parallel to a load and driven simultaneously.

DESCRIPTION OF THE RELATED ART

The power supply disclosed in Patent Literature 1 (Japanese Laid-open Patent Publication No. 2007-221880) is widely known as one example of this type of power supply. A plurality of the disclosed power supplies include: power circuits that are connected in parallel to the same load and convert and output an inputted direct current (hereinafter, "DC") voltage to a voltage (or "output voltage") required by the load; terminals (or "current balancing terminals") that are connected to each other by a shared line (or wire); output current detector circuits that detect output currents outputted to the load and output voltages that are proportional to the output currents; and parallel driving circuits. Here, to realize the output current detector circuits, it is possible for example to use a method that detects voltage across both ends of a shunt resistor or a detection method that uses a Hall element. Each parallel driving circuit compares the output current with an average current (or in more detail, compares a voltage outputted from the output current detector circuit and a voltage generated by a current balancing element (that is, a voltage that is proportional to an average value of the output currents (or "average current") outputted from the respective power supplies), executes control that causes the power circuit to increase the output voltage when the output current of this power supply is smaller than the average current, thereby increasing the output current, and executes control that causes the power circuit to decrease the output voltage when the output current of this power supply is larger than the average current, thereby decreasing the output current.

With the configuration described above, when a plurality of power supplies are connected in parallel to the same load (a so-called "parallel driving state"), the output currents of the power supplies are controlled to become equal.

SUMMARY OF THE INVENTION

However, the power supply described above has the following problem to be solved. Although the parallel driving circuit of each power supply uses a voltage outputted from the output current detector circuit as a value indicating the output current, since values such as the resistance of the shunt resistor that constructs the output current detector circuit, the amplification factor of the amplifier that amplifies the voltage detected at the shunt resistor, and the detection sensitivity of the Hall element all fluctuate within ranges of tolerance stipulated within the respective product specifications (or in simpler terms, since a detection error is present for the output current detector circuit), even if the voltages outputted from output current detector circuits are equal, the output currents will not necessarily be equal. Accordingly, this power supply has a problem to be solved in that due to the detection error at the output current detector circuit, it is difficult to perform control that correctly sets the respective output currents at the same value in the parallel driving state.

The present invention was conceived to solve the problem described above and has a principal object of providing a power supply capable of more accurately matching output currents in a parallel driving state.

To achieve the stated object, a power supply according to the present invention comprises: a power converter that converts an input voltage by switching at a switch and supplies an output voltage and an output current to an output terminal to which a load is connected; a current detector that detects one of the output current and a current that changes in keeping with the output current and outputs a current detection signal whose voltage value changes in keeping with changes in the output current; a signal corrector that inputs the current detection signal, performs correction of the current detection signal, and generates and outputs a corrected current detection signal with a voltage value that corresponds to a current value of the output current; a matching circuit that inputs the corrected current detection signal and outputs to a balanced terminal; and a controller that inputs the corrected current detection signal and a balanced voltage signal generated at the balanced terminal and controls switching operations of the switch so as to reduce a difference between voltage values of the corrected current detection signal and the balanced voltage signal.

Here, the signal corrector includes: a reference signal outputter that inputs the current detection signal and outputs a current detection reference signal generated by correcting a detection error produced in the current detection signal at the current detector; an amplifier that inputs and amplifies the corrected current detection signal and outputs an amplified detection signal; and a voltage controller that inputs the current detection reference signal and the amplified detection signal and controls the voltage value of the corrected current detection signal based on a difference between the current detection reference signal and the amplified detection signal to match the amplified detection signal to the current detection reference signal.

According to the above power supply, when a plurality of the power supplies are connected in parallel to the same load and the balanced terminals of the respective power supplies are connected by the same line, since a corrected current detection signal that is not affected by detection errors that are produced at the current detectors (that is, a corrected current detection signal whose voltage value accurately corresponds to the current value of the output current) is outputted to each balanced terminal, it is possible to accurately match (i.e., set equal) the current values of the output currents outputted from the respective power supplies to the load without being affected by detection errors that are individually produced at the current detectors of the respective power supplies.

Also, in the power supply according to the present invention, the reference signal outputter includes an A/D converter, which converts the current detection signal to first voltage information indicating the voltage value of the current detection signal, and a reference signal calculator, which calculates reference signal information indicating a voltage value of the current detection reference signal by correcting the first voltage information based on correction information set in advance, the amplifier includes an A/D converter, which converts the corrected current detection signal to second voltage information indicating a voltage value of the corrected current detection signal, and an amplified signal calculator, which calculates amplified signal information indicating a voltage value of the amplified detection signal based on the second voltage information and amplification information set in advance, and the voltage controller includes a difference calculator, which inputs the reference signal information and the amplification signal information and calculates a difference between the reference signal information and the amplification signal information, and a control voltage generator, which generates one voltage out of a control pulse voltage whose duty ratio changes in keeping with the calculated difference and a control voltage whose voltage value changes in keeping with the calculated difference, the voltage controller controlling the voltage value of the corrected current detection signal based on the one voltage.

According to the above power supply, it is possible, through digital processing, to calculate the reference signal information, to calculate the amplification signal information, and to generate a control pulse voltage or a control voltage based on such information and thereby control the voltage value of the corrected current detection signal. This means that according to this power supply, it is possible to calculate the reference signal information produced by accurately removing, using digital processing, the detection error that occurs at the current detector from the current detection signal. By doing so, it is possible to output, to the balanced terminal, a corrected current detection signal that more accurately corresponds to the current value of the output current, which makes it possible to match (that is, set equal) the current values of the output currents outputted from the respective power supplies to the load significantly more accurately.

Further, in the power supply according to the present invention, the reference signal outputter, the amplifier, and the control voltage generator are constructed of one of a microcomputer and a digital signal processor. By using this configuration, it is possible to integrate the circuits that construct the reference signal outputter, the amplifier, and the control voltage generator, which makes it possible to miniaturize the signal corrector.

That is, according to the present invention, since it is possible to output a corrected current detection signal that is not affected by detection errors produced at the current detector to the balanced terminal, it is possible to accurately match (i.e., set equal) the current values of the output currents outputted from the respective power supplies in a state where a plurality of the power supplies are connected in parallel.

It should be noted that the disclosure of the present invention relates to the contents of Japanese Patent Application No. 2017-217874 that was filed on Nov. 13, 2017, the entire contents of which are herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Figure 1:
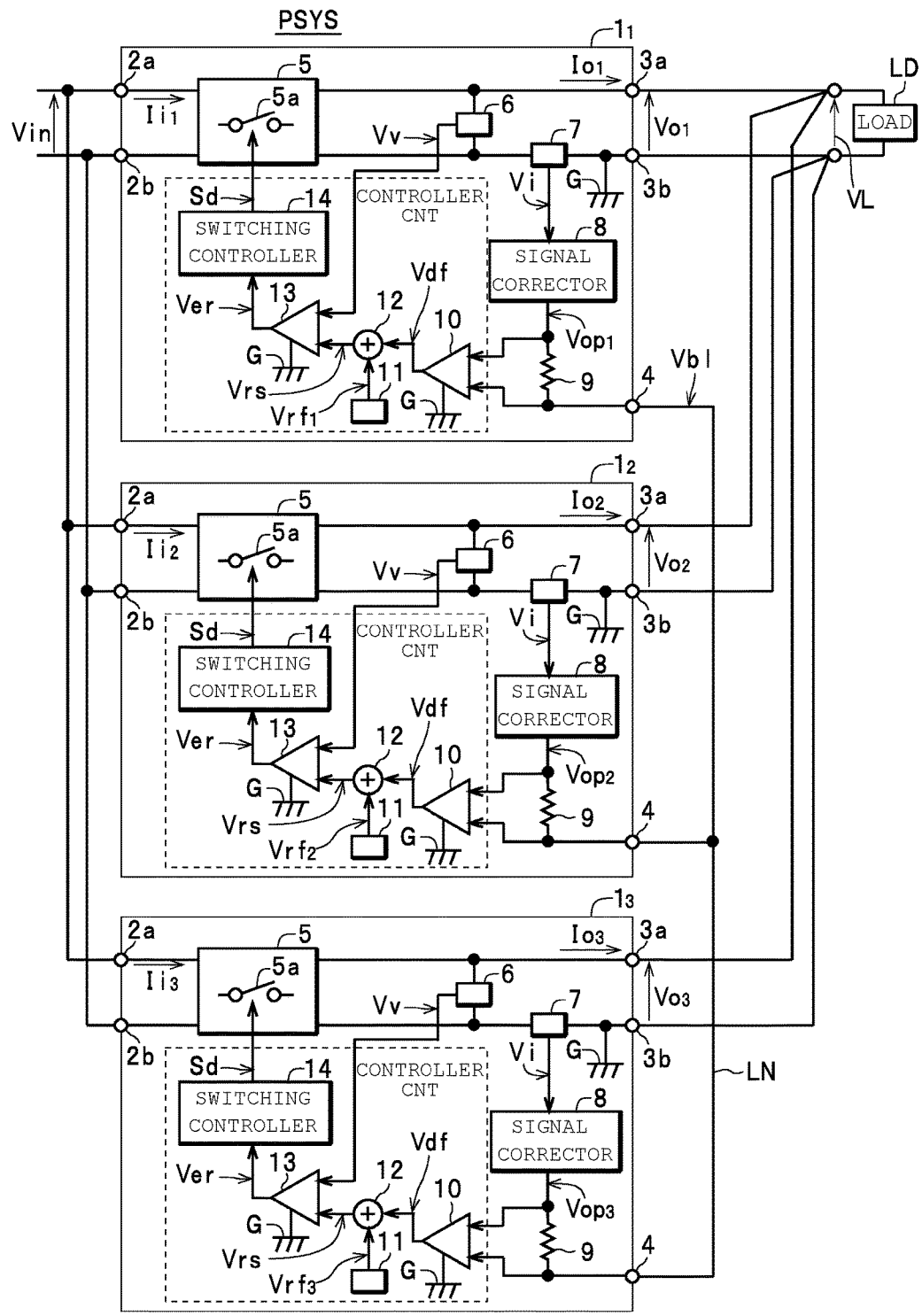
FIG. 1 is a diagram depicting the configuration of a power supply 1 and a configuration where three power supplies 1 are connected in parallel and simultaneously driven.

Preferred embodiments of a power supply will now be described with reference to the attached drawings.

First, the configuration of a power supply 1 as one example of a "power supply" according to the present invention will be described with reference to FIG. 1. As one example, each power supply 1 (in FIG. 1, the three power supplies 1 are labeled as power supplies $1_1$, $1_2$, and $1_3$ for distinguishing purposes) includes a pair of input terminals 2a and 2b (hereinafter referred to as the "input terminals 2" when no distinction is made between them), a pair of output terminals 3a and 3b (hereinafter referred to as the "output terminals 3" when no distinction is made between them), a balanced terminal 4, a power converter 5, a voltage detector 6, a current detector 7, a signal corrector 8, a matching circuit 9, a comparator 10, a reference voltage outputter 11, a voltage synthesizer 12, an error detector 13, and a switching controller 14. The power supply 1 is configured to convert an input voltage Vin inputted across the input terminals 2 by switching at the power converter 5 (more specifically, a switch 5a, described later, of the power converter 5) and supply an output voltage (DC output voltage) Vo and an output current (DC output current) Io across the output terminals 3, to which a load LD is connected. Note that in FIG. 1, corresponding to the three power supplies $1_1$, $1_2$, and $1_3$, the output voltages are labelled $Vo_1$, $Vo_2$, and $Vo_3$ and the output currents are labelled $Io_1$, $Io_2$, and $Io_3$.

The power converter 5 includes at least one switch 5a and, by using the switch 5a to switch the input voltage Vin inputted via the input terminals 2, converts the input voltage Vin to the output voltage Vo and outputs the output voltage Vo across the output terminals 3. The power converter 5 also outputs the output current Io to be supplied to the load LD to the output terminals 3. The power converter 5 is configured as an AC-DC converter that outputs the output voltage Vo when the input voltage Vin is an AC voltage and as a DC-DC converter that outputs the output voltage Vo when the input voltage Vin is a DC voltage. Here, the switch 5a performs switching operations (on/off operations) according to a driving signal Sd, described later, outputted from the switching controller 14.

The voltage detector 6 detects the output voltage Vo and outputs a detection voltage Vv as a voltage detection signal indicating a voltage value of the output voltage Vo (that is, a detection voltage Vv whose voltage value changes in keeping with the voltage value of the output voltage Vo (a voltage that uses the potential of an internal ground G of the power supply 1 as a reference)).

The current detector 7 detects the output current Io, converts the output current Io to a detection voltage Vi as a current detection signal indicating the current value of the output current Io (that is, a detection voltage Vi whose voltage value changes in keeping with the current value of the output current Io), and outputs the detection voltage Vi. Although not illustrated, as one example the current detector 7 is constructed of a current detecting resistor disposed on a current path of the output current Io and an amplifier that amplifies and outputs a voltage generated across both ends of the current detecting resistor. Note that the current detector 7 is not limited to the configuration described above that directly detects the output current Io. It is also possible for the current detector 7 to use a configuration that outputs the detection voltage Vi by detecting another current (for example, an input current Ii) whose current value changes in keeping with the current value of the output current Io. In FIG. 1, the input currents Ii are labelled as the input currents $Ii_1$, $Ii_2$, and $Ii_3$ corresponding to the three power supplies $1_1$, $1_2$, and $1_3$.

The signal corrector 8 inputs the detection voltage Vi, executes correction of the detection voltage Vi to generate a corrected current detection signal Vop (labeled as the corrected current detection signals $Vop_1$, $Vop_2$, and $Vop_3$ in FIG. 1 corresponding to the three power supplies $1_1$, $1_2$, and $1_3$) with a voltage value corresponding to the current value of the output current Io, and outputs the corrected current detection signal Vop. Here, it is assumed that the voltage value of the corrected current detection signal Vop corresponds to the current value of the output current Io due to the voltage value of the corrected current detection signal Vop changing in keeping with changes in the current value of the output current Io to a stipulated voltage value (that is, a voltage value that is common to the power supplies $1_1$, $1_2$, and $1_3$) associated in advance with the current value. Accordingly, when the current value of the output current Io is equal for the power supplies $1_1$, $1_2$, and $1_3$, the voltage values of the corrected current detection signals $Vop_1$, $Vop_2$, and $Vop_3$ of the power supplies $1_1$, $1_2$, and $1_3$ also become equal.

Figure 2:
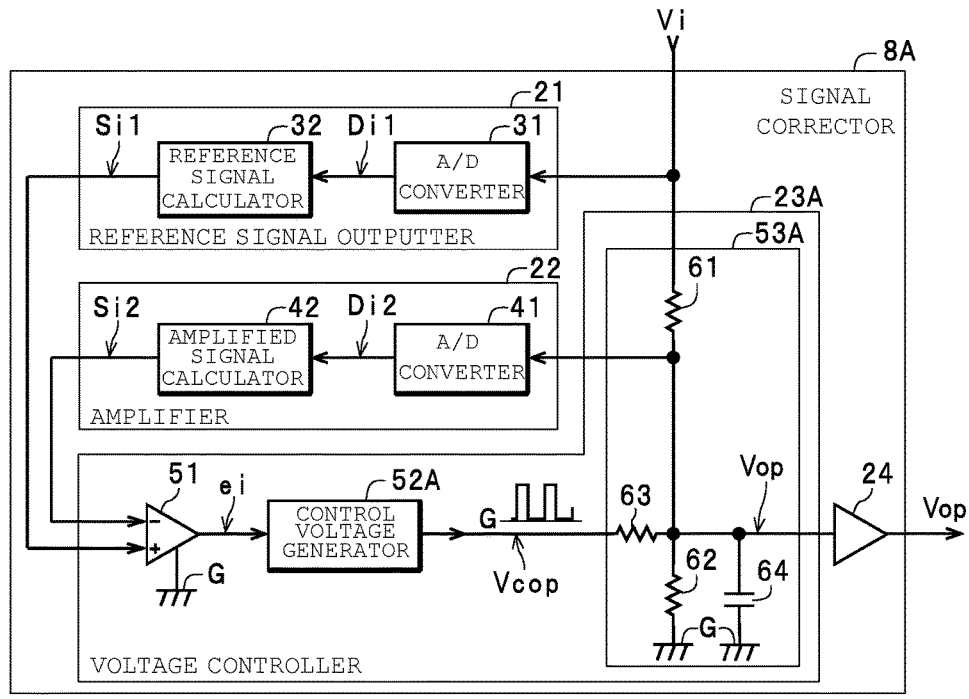
FIG. 2 is a diagram depicting the configuration of a signal corrector 8A that is one example of the signal corrector 8 in FIG. 1.
Figure 3:
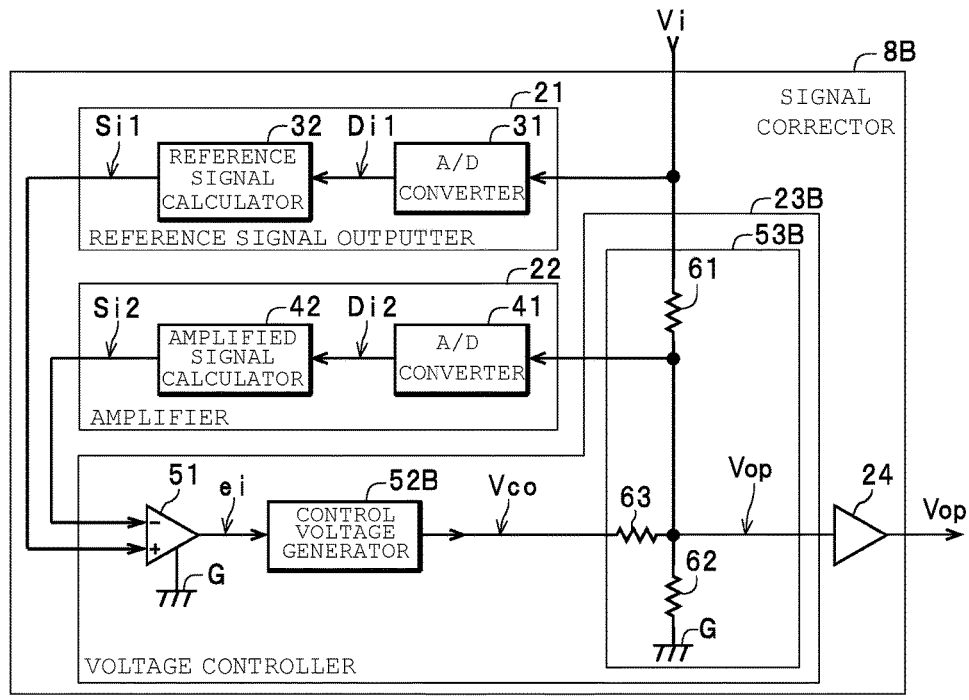
FIG. 3 is a diagram depicting the configuration of a signal corrector 8B that is another example of the signal corrector 8 in FIG. 1.

As one example, the signal corrector 8 is configured as one of a signal corrector 8A depicted in FIG. 2 and a signal corrector 8B depicted in FIG. 3.

As depicted in FIG. 2, the signal corrector 8A includes a reference signal outputter 21, an amplifier 22, a voltage controller 23A, and a buffer 24.

The reference signal outputter 21 inputs the detection voltage Vi and outputs a current detection reference signal Si1 that has been corrected for detection errors produced in the detection voltage Vi at the current detector 7 (as examples, a detection error due to fluctuations in the resistance value within tolerance of the current detecting resistor and a detection error due to fluctuations in the amplification factor within tolerance of the amplifier). In other words, the reference signal outputter 21 corrects and removes the detection errors described above, which are produced in the detection voltage Vi at the current detector 7, from the detection voltage Vi and outputs the current detection reference signal Si1. By doing so, the current detection reference signal Si1 is a signal that changes in keeping with changes in the current value of the output current Io to a set value associated in advance with the current value of the output current Io. That is, this set value is the same value for each power supply 1 when the current values of the output currents Io of the power supplies $1_1$, $1_2$, and $1_3$ become equal once the respective detection errors that are produced at the respective current detectors 7 of the power supplies $1_1$, $1_2$, and $1_3$ have been removed.

Here, when the reference signal outputter 21 generates and outputs the current detection reference signal Si1 as a voltage signal that is an analog signal, the current detection reference signal Si1 will be a signal whose voltage value changes to a set value (voltage value) that is associated in advance with the current value of the output current Io. Conversely, when the reference signal outputter 21 generates and outputs the current detection reference signal Si1 as a digital signal, the current detection reference signal Si1 is reference signal information whose value changes to a set value that is associated in advance with the current value of the output current Io.

As one example, the reference signal outputter 21 includes an A/D converter 31 and a reference signal calculator 32 and generates and outputs the current detection reference signal Si1 (or "reference signal information") by digital processing. Here, the A/D converter 31 converts the detection voltage Vi to waveform data Di1 as first voltage information indicating the voltage value of the detection voltage Vi. More specifically, the A/D converter 31 converts to the waveform data Di1 for the detection voltage Vi by sampling the detection voltage Vi with a predetermined sampling period (for example, a period sufficiently shorter than a switching period of the switch 5a). As one example, the reference signal calculator 32 is constructed of a digital signal processor (DSP) and corrects the waveform data Di1 based on correction information set in advance to calculate (output) the current detection reference signal Si1 (or "reference signal information") described above. In the present embodiment, the voltage controller 23A is configured to perform digital processing and the reference signal calculator 32 is configured to output the calculated current detection reference signal Si1 (or "reference signal information") as it is, but when the voltage controller 23A is configured to perform analog processing, the reference signal calculator 32 is configured to subject the calculated reference signal information to D/A conversion and output the current detection reference signal Si1 that is an analog signal whose voltage value changes to a set voltage value that is associated in advance with the current value of the output current Io.

To make it possible to change the value of the current detection reference signal Si1 from a set reference value Vsra to a set reference value Vsrb ($\neq$Vsra) when the current value of the output current Io has changed from a set current value Ioa to a set current value Iob ($\neq$Ioa), as one example the correction information is calculated separately for each power supply 1 in an adjustment process for the power supplies 1 and stored as an arithmetic expression or a conversion table in the reference signal calculator 32 of each power supply 1. Here, the detection error produced at the current detector 7 will differ between individual power supplies 1 due to fluctuations within tolerance in the resistance value of the current detecting resistor that constructs the current detector 7 and/or fluctuations within tolerance in the amplification factor of the amplifier that constructs the current detector 7. For this reason, the correction information described above will typically differ between individual power supplies 1. Although it is common to respond to the current value of the output current Io changing from the current value Ioa to the current value Iob by changing the value of the current detection reference signal Si1 from the reference value Vsra to the reference value Vsrb using a linear function, for example, the present invention is not limited to this.

The amplifier 22 inputs the corrected current detection signal Vop outputted from the voltage controller 23A as described later, amplifies the corrected current detection signal Vop, and outputs an amplified detection signal Si2.

As one example, the amplifier 22 includes an A/D converter 41 and an amplified signal calculator 42, and generates and outputs the amplified detection signal Si2 (or "amplified signal information) by digital processing. Here, the A/D converter 41 converts the corrected current detection signal Vop to waveform data Di2 as second voltage information indicating the voltage value of the corrected current detection signal Vop. More specifically, the A/D converter 41 converts to the waveform data Di2 for the corrected current detection signal Vop by sampling the corrected current detection signal Vop with a predetermined sampling period (that is, the same period as the sampling period of the A/D converter 31). The amplified signal calculator 42 is constructed of a DSP for example, and calculates (outputs) the amplified detection signal Si2 (or "amplified signal information") described above based on the waveform data Di2 and amplification information set in advance (as one example, by multiplying the waveform data Di2 by a predetermined constant (amplification factor) indicated by the amplification information). In the present embodiment, the voltage controller 23A is configured to perform digital processing and the amplified signal calculator 42 is configured to output the calculated amplified detection signal Si2 (or "amplified signal information") as it is, but when the voltage controller 23A is configured to perform analog processing, the amplified signal calculator 42 is configured to subject the calculated amplified signal information to D/A conversion and outputs the amplified detection signal Si2 that is an analog signal whose voltage value changes corresponding to the voltage value of the corrected current detection signal Vop.

The corrected current detection signal Vop is a voltage that is generated by a voltage synthesizer 53A (described later) that constructs the voltage controller 23A synthesizing the detection voltage Vi and the average voltage of a control pulse voltage Vcop, also described later. Here, the resistance value of a resistor 63 (described later) that constructs the voltage synthesizer 53A (that is, the resistor to which an average voltage of the control pulse voltage Vcop is applied) is set at a value that is sufficiently higher (for example, a value that is ten to several ten times higher) than the resistance value of another resistor 61 (described later) that constructs the voltage synthesizer 53A (that is, the resistor to which the detection voltage Vi is applied). Accordingly, the corrected current detection signal Vop is a voltage that changes mainly due to the influence of the detection voltage Vi that has been divided by voltage dividing resistors (resistors 61 and 62), described later, that construct the voltage synthesizer 53A. For this reason, as one example of the amplification information, the reciprocal of the voltage dividing ratio of the voltage dividing resistors (the resistors 61 and 62) (=the rated resistance value of the resistor 61/(the total of the rated resistance values of the resistors 61 and 62)) is stored in advance as the amplification information described above. Also, since the configurations of the signal correctors 8 in the respective power supplies 1 are the same, the amplification information stored in the amplified signal calculator 42 in each power supply 1 is the same.

The voltage controller 23A inputs the current detection reference signal Si1 and the amplified detection signal Si2 and controls the voltage value of the corrected current detection signal Vop based on the difference between the current detection reference signal Si1 and the amplified detection signal Si2 to match the voltage value of the amplified detection signal Si2 to the voltage value of the current detection reference signal Si1 (that is, to match the amplified detection signal to the current detection reference signal).

As one example, the voltage controller 23A includes a difference calculator 51 and a control voltage generator 52A. The voltage controller 23A also includes the voltage synthesizer 53A that generates the corrected current detection signal Vop based on the detection voltage Vi and controls the voltage value of the corrected current detection signal Vop based on the control pulse voltage Vcop, described later, outputted from the control voltage generator 52A. In the present embodiment, the voltage controller 23A is constructed of a DSP.

The difference calculator 51 inputs the current detection reference signal Si1 and the amplified detection signal Si2, calculates the difference between the current detection reference signal Si1 and the amplified detection signal Si2 (that is, the difference between the respective voltage values) by digital processing and outputs as a difference signal ei. As one example, the difference calculator 51 outputs a surplus or shortfall in the value of the amplified detection signal Si2 relative to the value of the current detection reference signal Si1 as the difference signal ei whose value changes in proportion to an absolute value of this surplus or shortfall, whose polarity is negative when there is a surplus, and whose polarity is positive when there is a shortfall. Note that when the difference calculator 51 is constructed of an analog circuit such as an operational amplifier and the difference signal ei is outputted by analog processing, the difference calculator 51 detects the surplus or shortfall of the voltage value of the amplified detection signal Si2 relative to the voltage value of the current detection reference signal Si1 and outputs the difference signal ei as an analog signal.

The control voltage generator 52A generates and outputs the control pulse voltage Vcop whose duty ratio changes in keeping with the difference described above calculated by the difference calculator 51 (that is, in keeping with the difference signal ei). As one example, the control pulse voltage Vcop is a pulse voltage that uses the potential of the internal ground G as a reference. The amplitude of the control pulse voltage Vcop is set at a voltage value that is slightly higher than a voltage value obtained by multiplying a maximum value of the detection voltage Vi (that is, the voltage value when the maximum value of the output current Io flows to the current detecting resistor) by the voltage dividing ratio of the voltage dividing resistors (that is, the resistors 61 and 62). When the polarity of the difference signal ei is negative, the control voltage generator 52A also reduces the duty ratio of the control pulse voltage Vcop (that is, lowers the average voltage of the control pulse voltage Vcop) in keeping with the absolute value of the value (or voltage value) of the difference signal ei. Conversely, when the polarity of the difference signal ei is positive, the control voltage generator 52A increases the duty ratio of the control pulse voltage Vcop (that is, raises the average voltage of the control pulse voltage Vcop) in keeping with the absolute value of the value (or voltage value) of the difference signal ei.

Note that although not illustrated, in place of the configurations of the difference calculator 51 and the control voltage generator 52A described above, it is also possible to use configurations where the difference calculator 51 outputs a surplus or shortfall in the value (or voltage value) of the amplified detection signal Si2 relative to the value (or voltage value) of the current detection reference signal Si1 as the difference signal ei, whose value (or voltage value) changes in proportion to an absolute value of the surplus or shortfall, whose polarity is positive when there is a surplus, and whose polarity is negative when there is a shortfall, and the control voltage generator 52A reduces the duty ratio of the control pulse voltage Vcop (that is, lowers the average voltage of the control pulse voltage Vcop) in keeping with the absolute value of the value (or voltage value) of the difference signal ei when the polarity of the difference signal ei is positive and increases the duty ratio of the control pulse voltage Vcop (that is, raises the average voltage of the control pulse voltage Vcop) in keeping with the absolute value of the value (or voltage value) of the difference signal ei when the polarity of the difference signal ei is negative.

As one example, the voltage synthesizer 53A includes the resistors 61, 62, and 63 and a capacitor 64. Here, the resistor 61 has the detection voltage Vi applied to one end and is connected at the other end to one end of the resistor 62. The resistor 62 has one end connected to the other end of the resistor 61 and another end connected to the internal ground G of the power supply 1. With this arrangement, the resistors 61 and 62 that are connected in series function as voltage dividing resistors that divide the detection voltage Vi. The resistor 63 has one end connected to an output terminal of the control voltage generator 52A to which the control pulse voltage Vcop is applied and has another end connected to a junction between the resistors 61 and 62. By using the above configuration, a voltage produced by synthesizing the detection voltage Vi applied to one end of the resistor 61 and the average voltage of the control pulse voltage Vcop applied to one end of the resistor 63 is generated as the corrected current detection signal Vop at the junction between the resistors 61 and 62.

Here, the resistance value of the resistor 63 is set at a sufficiently higher value (for example, a value that is ten to several ten times higher) than the resistance value of the resistor 61. Accordingly, the corrected current detection signal Vop is a voltage whose voltage value changes mainly due to the influence of the detection voltage Vi that has been divided by the voltage dividing resistors (that is, the resistors 61 and 62) and whose voltage value may be slightly adjusted according to the average voltage of the control pulse voltage Vcop. The capacitor 64 is connected in parallel to the resistor 62 and smoothes the corrected current detection signal Vop.

As one example, the buffer 24 is constructed of a voltage follower circuit including an operational amplifier, inputs the corrected current detection signal Vop, and outputs the corrected current detection signal Vop as it is with low impedance.

As depicted in FIG. 3, the signal corrector 8B includes the reference signal outputter 21, the amplifier 22, a voltage controller 23B, and the buffer 24. Since component elements that have been assigned the same reference numerals are the same as in the signal corrector 8A, description thereof is omitted and the different component elements will be described.

In the same way as the voltage controller 23A, the voltage controller 23B inputs the current detection reference signal Si1 and the amplified detection signal Si2 and controls the voltage value of the corrected current detection signal Vop based on the difference between the values (or voltage values) of the current detection reference signal Si1 and the amplified detection signal Si2 to match the amplified detection signal Si2 to the current detection reference signal Si1.

As one example, the voltage controller 23B includes the difference calculator 51 and a control voltage generator 52B, and further includes a voltage synthesizer 53B for controlling the voltage value of the corrected current detection signal Vop to be outputted based on a control voltage Vco, described later, outputted from the control voltage generator 52B. Here, since the difference calculator 51 is the same as in the voltage controller 23A described above, description thereof is omitted and the control voltage generator 52B and the voltage synthesizer 53B will be described.

As one example, the control voltage generator 52B includes a D/A converter, and outputs the control voltage Vco whose voltage value changes in keeping with the difference described above calculated by the difference calculator 51. As one example, the control voltage Vco is a voltage that has the potential of the internal ground G as a reference and whose voltage value changes between the potential of the internal ground G and a voltage value that is slightly higher than a voltage value obtained by multiplying the maximum value of the detection voltage Vi (the voltage value when the maximum value of the output current Io flows to the current detecting resistor) by the voltage dividing ratio of the voltage dividing resistors (the resistors 61 and 62). When the polarity of the difference signal ei is negative, the control voltage generator 52B lowers the control voltage Vco, while when the polarity of the difference signal ei is positive, the control voltage generator 52B raises the control voltage Vco.

Note that although not illustrated, in place of the configurations described above of the difference calculator 51 and the control voltage generator 52B, it is also possible to use configurations where the difference calculator 51 outputs a surplus or shortfall in the value (or voltage value) of the amplified detection signal Si2 relative to the value (or voltage value) of the current detection reference signal Si1 as the difference signal ei whose value (or voltage value) changes in proportion to an absolute value of this surplus or shortfall, whose polarity is positive when there is a surplus, and whose polarity is negative when there is a shortfall, and the control voltage generator 52B lowers the control voltage Vco when the polarity of the difference signal ei is positive and raises the control voltage Vco when the polarity of the difference signal ei is negative.

As one example, aside from the omission of the capacitor 64, the voltage synthesizer 53B has the same configuration as the voltage synthesizer 53A, synthesizes the detection voltage Vi applied to one end of the resistor 61 and the control voltage Vco applied to one end of the resistor 63, and applies the result as the corrected current detection signal Vop to the junction between the resistors 61 and 62.

As one example, as depicted in FIG. 1, the matching circuit 9 is constructed of a resistor (that is, a resistor with a set resistance value). For this reason, in the present embodiment, the expression "resistor 9" is also used below. One end of the resistor 9 is connected to the signal corrector 8 so that the corrected current detection signal Vop is applied to the one end of the resistor 9. The other end of the resistor 9 is connected to the balanced terminal 4. That is, the resistor 9 outputs the corrected current detection signal Vop outputted from the signal corrector 8 to the balanced terminal 4. When a plurality of the power supplies 1 are connected in parallel and simultaneously driven, as depicted in FIG. 1, the balanced terminal 4 is connected to the same line LN (or balanced line) as the balanced terminals 4 of other power supplies 1. Here, the resistors (resistors with the same resistance values) 9 of the respective power supplies 1 whose other ends are connected to each other by the line LN construct a known averaging circuit for an analog voltage. Accordingly, the corrected current detection signals Vop applied from the signal correctors 8 of the respective power supplies 1 to the one ends of the resistors 9 of the power supplies 1 are averaged by the averaging circuit constructed by the resistors 9 so that an averaged voltage is generated at the respective balanced terminals 4 as a balanced voltage Vb1 that is a balanced voltage signal.

The comparator 10 is constructed using an operational amplifier, for example, and as depicted in FIG. 1, compares the corrected current detection signal Vop and the balanced voltage Vb1, and outputs a difference voltage Vdf as a voltage difference signal that changes in keeping with the difference between the voltages Vop and Vb1 (that is, a voltage whose voltage value changes in keeping with the difference). Together with the reference voltage outputter 11, the voltage synthesizer 12, the error detector 13, and the switching controller 14, the comparator 10 constructs a controller CNT that controls switching operations of the switch 5a. As one example, when the corrected current detection signal Vop is lower than the balanced voltage Vb1, the comparator 10 outputs the difference voltage Vdf whose polarity is positive and whose voltage value is proportional to an absolute value of the difference between the voltages Vop and Vb1, but when the corrected current detection signal Vop is higher than the balanced voltage Vb1, the comparator 10 outputs the difference voltage Vdf whose polarity is negative and whose voltage value is proportional to an absolute value of the difference between the voltages Vop and Vb1. The comparator 10 outputs the difference voltage Vdf as a signal that reduces the difference between the voltages Vop and Vb1.

The reference voltage outputter 11 outputs a first reference voltage Vrf as a first reference voltage signal indicating a first reference voltage value corresponding to an initial target voltage value for the output voltage Vo of the present power supply 1 (in FIG. 1, the first reference voltages are labelled as $Vrf_1$, $Vrf_2$, and $Vrf_3$ corresponding to the three power supplies $1_1$, $1_2$, and $1_3$). As one example, when a plurality of the power supplies 1 are connected in parallel to the load LD and simultaneously driven, it is rare for the lengths of the wires that connect the respective power supplies 1 and the load LD to be the same, so that the lengths will normally be different. Since the voltage drop that will occur on the wires differs between the power supplies 1, the first reference voltage value of the first reference voltage Vrf is individually adjusted with consideration to the voltage drop that is specific to each power supply 1.

As depicted in FIG. 1, the voltage synthesizer 12 synthesizes (adds) the first reference voltage signal and a voltage difference signal (in the present embodiment, the first reference voltage Vrf and the difference voltage Vdf) and outputs a second reference voltage Vrs as a second reference voltage signal. Here, the polarity and voltage value of the difference voltage Vdf change as described above based on the corrected current detection signal Vop and the balanced voltage Vb1. When the corrected current detection signal Vop and the balanced voltage Vb1 match, the difference voltage Vdf will become zero volts so that the second reference voltage Vrs will become the same voltage value as the first reference voltage Vrf. When the corrected current detection signal Vop is lower than the balanced voltage Vb1, the difference voltage Vdf will have positive polarity and a voltage value that is proportional to the absolute value of the difference between the voltages Vop and Vb1, so that the second reference voltage Vrs will become a voltage value that is the absolute value of the difference voltage Vdf higher than the first reference voltage Vrf. Conversely, when the corrected current detection signal Vop is higher than the balanced voltage Vb1, the difference voltage Vdf will have negative polarity and a voltage value that is proportional to the absolute value of the difference between the voltages Vop and Vb1, so that the second reference voltage Vrs will become a voltage value that is the absolute value of the difference voltage Vdf lower than the first reference voltage Vrf.

The error detector 13 is constructed of an operational amplifier, for example, and as depicted in FIG. 1, compares the detection voltage signal and the second reference voltage signal (in the present embodiment, the detection voltage Vv and the second reference voltage Vrs) and outputs an error voltage Ver as an error voltage signal that changes in keeping with the difference between the voltages Vv and Vrs (that is, a voltage whose voltage value changes in keeping with the difference). As one example, when the detection voltage Vv is lower than the second reference voltage Vrs, the error detector 13 outputs the error voltage Ver with positive polarity and a voltage value that is proportional to the absolute value of the difference between the voltages Vv and Vrs, and conversely when the detection voltage Vv is higher than the second reference voltage Vrs, the error detector 13 outputs the error voltage Ver with negative polarity and a voltage value that is proportional to the absolute value of the difference between the voltages Vv and Vrs. The error detector 13 outputs the error voltage Ver as a signal for reducing the difference between the voltages Vv and Vrs. Note that although a configuration (or "P control configuration") where the error detector 13 outputs the error voltage Ver with a voltage value that is proportional to the absolute value of the difference between the voltages Vv and Vrs is used as described above in the present embodiment, in place of this configuration, it is also possible to use a "PI control configuration", that is, a configuration which, when outputting a next error voltage Ver following the output of the previous error voltage Ver, outputs (Ver+ΔVer) produced by adding a value (ΔVer) that corresponds to the present difference between the voltages Vv and Vrs to the previous error voltage Ver.

As depicted in FIG. 1, by generating the driving signal Sd based on the error voltage signal outputted from the error detector 13 (in the present embodiment, the error voltage Ver) and outputting the driving signal Sd to the switch 5a of the power converter 5, the switching controller 14 controls switching operations of the switch 5a so as to reduce the difference between the corrected current detection signal Vop and the balanced voltage Vb1 and reduce the difference between the detection voltage signal and the second reference voltage signal (in the present embodiment, the detection voltage $V_v$ and the second reference voltage Vrs). In more detail, when the power converter 5 is configured to control the output voltage Vo according to PWM (pulse width modulation) control, the switching controller 14 controls the duty ratio of the driving signal Sd to reduce the difference between the two voltages Vop and Vb1 and controls switching operations of the switch 5a so as to reduce the difference between the two voltages Vv and Vrs. On the other hand, when the power converter 5 is configured to control the output voltage Vo according to PFM (pulse frequency modulation) control, the switching controller 14 controls the frequency of the driving signal Sd to reduce the difference between the two voltages Vop and Vb1 and controls switching operations of the switch 5a so as to reduce the difference between the two voltages Vv and Vrs.

Next, the operation of the power supply 1 will be described for an example of a power supply system PSYS where a plurality of power supplies 1 are connected in parallel to the same load LD (as one example in the present embodiment, three power supplies 1 are connected in parallel as depicted in FIG. 1) and are simultaneously driven.

Note that although it is assumed that the same input voltage Vin is inputted into the respective input terminals 2 of the power supplies $1_1$, $1_2$, and $1_3$ as one example in the present embodiment, the present invention is not limited to this and it is possible to use a configuration where individual input voltages Vin are inputted into the respective input terminals 2 of the power supplies $1_1$, $1_2$, and $1_3$.

Also, although the power supplies $1_1$, $1_2$, and $1_3$ are respectively connected to the load LD, it is assumed that in a state before the respective balanced terminals 4 are connected by the same line LN, the respective first reference voltages Vrf are individually adjusted to the first reference voltages $Vrf_1$, $Vrf_2$, and $Vrf_3$ to make the voltage VL across the load LD equal when output currents Io with the same current value are outputted. Here, as one example, when the power supplies are ranked as the power supplies $1_1$, $1_2$, and $1_3$ in ascending order of the magnitude of the resistance values of the lines to the load LD, the voltage drop on the lines when output currents Io with the same current value flow will also increase in the given order. Since it is necessary to increase the output voltages $Vo_1$, $Vo_2$, and $Vo_3$ of the power supplies $1_1$, $1_2$, and $1_3$ in that order, it is assumed that the first reference voltages $Vrf_1$, $Vrf_2$, and $Vrf_3$ are adjusted so as to increase in that order.

In the power supply system PSYS depicted in FIG. 1, at each of the power supplies $1_1$, $1_2$, and $1_3$ that are simultaneously driven, the voltage detector 6 detects the output voltage Vo and outputs the detection voltage Vv, and on detecting the output current Io, the current detector 7 converts to the detection voltage Vi as a voltage signal that is outputted. Based on this detection voltage Vi, the signal corrector 8 outputs the corrected current detection signal $Vop_1$, $Vop_2$, or $Vop_3$ whose voltage value changes corresponding to the output current $Io_1$, $Io_2$, or $Io_3$.

Here, at the signal corrector 8, the reference signal outputter 21 inputs the detection voltage Vi and outputs the current detection reference signal Si1 in which the detection error that occurs in the detection voltage Vi at the current detector 7 has been corrected (that is, correction is performed to remove the detection error produced at the current detector 7 from the detection voltage Vi that includes that detection error and the result is outputted as the current detection reference signal Si1). The amplifier 22 inputs the corrected current detection signal Vop outputted from the voltage synthesizer 53A (or 53B), amplifies the corrected current detection signal Vop, and outputs the amplified detection signal Si2. The voltage controller 23A (or 23B) inputs the current detection reference signal Si1 outputted from the reference signal outputter 21 and the amplified detection signal Si2 outputted from the amplifier 22 and controls the voltage value of the corrected current detection signal Vop based on the difference between the values (or voltage values) of the current detection reference signal Si1 and the amplified detection signal Si2 so as to match the voltage value of the amplified detection signal Si2 to the voltage value of the current detection reference signal Si1. By doing so, the amplified detection signal Si2 generated based on the corrected current detection signal Vop is matched to the current detection reference signal Si1 (that is, a signal generated by removing the detection error produced at the current detector 7 from the detection voltage Vi), so that the corrected current detection signal Vop becomes a signal that correctly corresponds to the signal (the "current detection reference signal Si1") generated by removing the detection error produced at the current detector 7 from the detection voltage Vi.

Also, the corrected current detection signals $Vop_1$, $Vop_2$, and $Vop_3$ outputted from the signal correctors 8 of the power supplies $1_1$, $1_2$, and $1_3$ are applied to the one ends of the respective resistors 9, whose other ends are connected to each other via the balanced terminals 4 and the lines LN and which construct an averaging circuit. This means that the balanced voltage Vb1 (=$(Vop_1+Vop_2+Vop_3)/3$), which is the average voltage of the corrected current detection signals $Vop_1$, $Vop_2$, and $Vop_3$, is generated at the balanced terminals 4.

At the power supplies $1_1$, $1_2$, and $1_3$, the respective comparators 10 separately compare the corrected current detection signals $Vop_1$, $Vop_2$, and $Vop_3$ for the power supplies $1_1$, $1_2$, and $1_3$ and the common balanced voltage Vb1 and output a difference voltage Vdf which changes in keeping with the difference between the corrected current detection signals $Vop_1$, $Vop_2$, and $Vop_3$ for the power supplies $1_1$, $1_2$, and $1_3$ and the common balanced voltage Vb1. Here, as described above, when the corrected current detection signal Vop is lower than the balanced voltage Vb1, that is, when the output current Io of the power supply 1 provided with the signal corrector 8 that outputs this corrected current detection signal Vop is lower than the average of the output currents Io of the power supplies $1_1$, $1_2$, and $1_3$ indicated by the balanced voltage Vb1, the comparator 10 outputs the difference voltage Vdf whose polarity is positive and whose voltage value is proportional to the absolute value of the difference between the voltages Vop and Vb1. On the other hand, as described above, when the corrected current detection signal Vop is higher than the balanced voltage Vb1, that is, when the output current Io of the power supply 1 provided with the signal corrector 8 that outputs this corrected current detection signal Vop is higher than the average of the output currents Io of the power supplies $1_1$, $1_2$, and $1_3$ indicated by the balanced voltage Vb1, the comparator 10 outputs the difference voltage Vdf whose polarity is negative and whose voltage value is proportional to the absolute value of the difference between the voltages Vop and Vb1.

In each of the power supplies $1_1$, $1_2$, and $1_3$, the voltage synthesizer 12 synthesizes (adds) the first reference voltage Vrf and the difference voltage Vdf described above and outputs the second reference voltage Vrs. By doing so, at a power supply 1 where the output current Io is lower than the average of the output currents Io of the power supplies $1_1$, $1_2$, and $1_3$ indicated by the balanced voltage Vb1, a positive difference voltage Vdf is synthesized with (added to) the first reference voltage Vrf, which results in the second reference voltage Vrs having a higher voltage value than the first reference voltage Vrf. On the other hand, at a power supply 1 where the output current Io is higher than the average of the output currents Io of the power supplies $1_1$, $1_2$, and $1_3$ indicated by the balanced voltage Vb1, a negative difference voltage Vdf is synthesized with (added to) the first reference voltage Vrf, which results in the second reference voltage Vrs having a lower voltage value than the first reference voltage Vrf.

At the power supplies $1_1$, $1_2$, and $1_3$, due to the error detector 13 outputting the error voltage Ver that changes in keeping with the difference between the detection voltage Vv and the second reference voltage Vrs and the switching controller 14 generating the driving signal Sd based on the error voltage Ver and outputting to the switch 5a of the power converter 5, switching operations of the switch 5a are controlled so that the difference between the voltages Vop and Vb1 decreases and the difference between the voltages Vv and Vrs decreases.

By doing so, at a power supply 1 where the output current Io is smaller than the average of the output currents Io of the power supplies $1_1$, $1_2$, and $1_3$ indicated by the balanced voltage Vb1, as described above the second reference voltage Vrs is higher than the first reference voltage Vrf and due to this, the switching controller 14 controls the switch 5a of the power converter 5 based on the error voltage Ver so that the difference between the voltages Vv and Vrs decreases, resulting in the output voltage Vo rising. Accordingly, at a power supply 1 where the output current Io is smaller than the average of the output currents Io of the power supplies $1_1$, $1_2$, and $1_3$, the output current Io is increased.

On the other hand, at a power supply 1 where the output current Io is larger than the average of the output currents Io of the power supplies $1_1$, $1_2$, and $1_3$ indicated by the balanced voltage Vb1, as described above the second reference voltage Vrs is lower than the first reference voltage Vrf and due to this, the switching controller 14 controls the switch 5a of the power converter 5 based on the error voltage Ver so that the difference between the voltages Vv and Vrs decreases, resulting in the output voltage Vo falling. Accordingly, at a power supply 1 where the output current Io is larger than the average of the output currents Io of the power supplies $1_1$, $1_2$, and $1_3$, the output current Io is reduced.

As a result, at the power supplies $1_1$, $1_2$, and $1_3$, the output voltages $Vo_1$, $Vo_2$, and $Vo_3$ are controlled so that the output currents $Io_1$, $Io_2$, and $Io_3$ indicated by the corrected current detection signals $Vop_1$, $Vop_2$, and $Vop_3$ match the average of the output currents $Io_1$, $Io_2$, and $Io_3$ of the power supplies $1_1$, $1_2$, and $1_3$ indicated by the balanced voltage Vb1, that is, so that the output currents $Io_1$, $Io_2$, and $Io_3$ respectively indicated by the corrected current detection signal $Vop_1$, $Vop_2$, and $Vop_3$ match each other.

In this way, at the power supply 1, the signal corrector 8 executes correction of the detection voltage Vi, generates the corrected current detection signal Vop that is a signal whose voltage value accurately corresponds to the value of the current detection reference signal Si1 (that is, the current value of the output current Io) generated by removing the detection error produced at the current detector 7 from the detection voltage Vi, and outputs the corrected current detection signal Vop via the resistor 9 to the balanced terminal 4.

In more detail, the signal corrector 8 includes the reference signal outputter 21 that inputs the detection voltage Vi and outputs the current detection reference signal Si1 in which the detection error that is produced in the detection voltage Vi at the current detector 7 has been corrected, the amplifier 22 that inputs and amplifies the corrected current detection signal Vop and outputs the amplified detection signal Si2, and the voltage controller 23A (or 23B) that inputs the current detection reference signal Si1 and the amplified detection signal Si2 and controls the voltage value of the corrected current detection signal Vop based on the difference between the values (or voltage values) of the current detection reference signal Si1 and the amplified detection signal Si2 to match the value (or voltage value) of the amplified detection signal Si2 to the value (or voltage value) of the current detection reference signal Si1.

Therefore, according to the power supply 1, when a plurality of the power supplies 1 are connected in parallel to the same load LD and the balanced terminals 4 of the respective power supplies 1 are connected by the same line LN, since the corrected current detection signal Vop that is not affected by detection errors that are produced at the current detector 7 (that is, the corrected current detection signal Vop whose voltage value accurately corresponds to the current value of the output current Io) is outputted to each balanced terminal 4, it is possible to accurately match (i.e., set equal) the current values of the output currents $Io_1$, $Io_2$, and $Io_3$ outputted from the power supplies 1 to the load LD without being affected by detection errors that are individually produced at the current detectors 7 of the power supplies 1.

Also, in the power supply 1, the reference signal outputter 21 includes the A/D converter 31, which converts the detection voltage Vi to the waveform data Di1 as first voltage information indicating the voltage value of the detection voltage Vi, and the reference signal calculator 32, which corrects the waveform data Di1 based on correction information set in advance and calculates and outputs the current detection reference signal Si1 (or "reference signal information") in which the detection error is corrected, the amplifier 22 includes the A/D converter 41, which converts the corrected current detection signal Vop to the waveform data Di2 as second voltage information indicating the voltage value of the corrected current detection signal Vop, and the amplified signal calculator 42, which calculates and outputs the amplified detection signal Si2 (or "amplification signal information") based on the waveform data Di2 and amplification information set in advance, and the voltage controller 23A includes the difference calculator 51, which inputs the current detection reference signal Si1 (or "reference signal information") and the amplified detection signal Si2 (or "amplification signal information") and calculates the difference between the signals Si1 and Si2, and the control voltage generator 52A, which generates the control pulse voltage Vcop whose duty ratio changes in keeping with the calculated difference, with the voltage controller 23A controlling the voltage value of the corrected current detection signal Vop based on the control pulse voltage Vcop. It is also possible for the power supply 1 to use a configuration that is equipped, in place of the voltage controller 23A, with the voltage controller 23B which includes the difference calculator 51 and the control voltage generator 52B that generates the control voltage Vco whose voltage value changes in keeping with the calculated difference between the signals Si1 and Si2 and which controls the voltage value of the corrected current detection signal Vop based on the control voltage Vco.

Accordingly, with the power supply 1, it is possible, through digital processing, to calculate the current detection reference signal Si1 (or "reference signal information"), to calculate the amplified detection signal Si2 (or "amplification signal information"), and to generate the control pulse voltage Vcop or the control voltage Vco based on the signals Si1 and Si2 and thereby control the voltage value of the corrected current detection signal Vop. This means that according to the power supply 1, it is possible to calculate the current detection reference signal Si1 (or "reference signal information") produced by accurately removing the detection error that occurs at the current detector 7 from the detection voltage Vi using digital processing. Since this makes it possible to output a corrected current detection signal Vop that more accurately corresponds to the current value of the output current Io to the balanced terminal 4, it is possible to match (that is, make equal) the current values of the output currents $Io_1$, $Io_2$, and $Io_3$ outputted from the respective power supplies 1 to the load LD significantly more accurately.

When the reference signal outputter 21, the amplifier 22, and the control voltage generator 52A (or 52B) are configured to perform digital processing as described above, it is preferable to construct the reference signal outputter 21, the amplifier 22, and the control voltage generator 52A (or 52B) of one of a microcomputer and a digital signal processor. By using this configuration, it is possible to integrate the circuits that construct the signal corrector 8, which makes it possible to miniaturize the signal corrector 8. As a configuration where the difference calculator 51 performs digital processing, it is also possible to construct the difference calculator 51 of one of a microcomputer and a digital signal processor. By using this configuration, it is possible to further integrate the circuits that construct the signal corrector 8.

What is claimed is:
1. A power supply comprising:
a power converter that converts an input voltage by switching at a switch and supplies an output voltage and an output current to an output terminal to which a load is connected;
a current detector that detects one of the output current and a current that changes in keeping with the output current and outputs a current detection signal whose voltage value changes in keeping with changes in the output current;
a signal corrector that receives the current detection signal, performs correction of the received current detection signal, and generates and outputs a corrected current detection signal with a voltage value that corresponds to a current value of the output current;
a matching circuit that receives the corrected current detection signal and outputs the received corrected current detection signal to a balanced terminal; and
a controller that receives the corrected current detection signal output from the signal corrector and receives a balanced voltage signal generated at the balanced terminal, and controls switching operations of the switch so as to reduce a difference between voltage values of the corrected current detection signal and the balanced voltage signal,
wherein the signal corrector includes:
a reference signal outputter that receives the current detection signal and outputs a current detection reference signal generated by correcting a detection error produced in the current detection signal at the current detector;
an amplifier that receives and amplifies the corrected current detection signal output from a voltage controller, and outputs an amplified detection signal; and
the voltage controller, which receives the current detection reference signal and the amplified detection signal, and controls the voltage value of the corrected current detection signal output therefrom based on a difference between the current detection reference signal and the amplified detection signal to match the amplified detection signal to the current detection reference signal.

2. The power supply according to claim 1,
wherein the reference signal outputter includes
an A/D converter, which converts the received current detection signal to first voltage information indicating the voltage value of the current detection signal, and
a reference signal calculator, which calculates reference signal information indicating a voltage value of the current detection reference signal by correcting the first voltage information based on correction information set in advance,
wherein the amplifier includes
an A/D converter, which converts the received corrected current detection signal to second voltage information indicating a voltage value of the corrected current detection signal, and
an amplified signal calculator, which calculates amplified signal information indicating a voltage value of the amplified detection signal based on the second voltage information and amplification information set in advance, and
wherein the voltage controller includes
a difference calculator, which receives the reference signal information and the amplification signal information and calculates a difference between the reference signal information and the amplification signal information, and
a control voltage generator, which generates one voltage out of a control pulse voltage whose duty ratio changes in keeping with the calculated difference between the reference signal information and the amplification signal information, and a control voltage whose voltage value changes in keeping with the calculated difference between the reference signal information and the amplification signal information, the voltage controller controlling the voltage value of the corrected current detection signal based on the one voltage.

3. The power supply according to claim 2,
wherein the reference signal outputter, the amplifier, and the control voltage generator comprise one of a microcomputer and a digital signal processor.

* * * * *